(12) United States Patent
Bailey et al.

(10) Patent No.: US 12,012,156 B2
(45) Date of Patent: Jun. 18, 2024

(54) YAW DAMPER FOR TWO-WHEELED SELF-BALANCING VEHICLE

(71) Applicant: Lit Motors Corporation, Portland, OR (US)

(72) Inventors: David Arthur Bailey, Glendale, AZ (US); Daniel Kee Young Kim, Portland, OR (US)

(73) Assignee: Lit Motors Corporation, Portland, OR (US)

( * ) Notice: Subject to any disclaimer, the term of this patent is extended or adjusted under 35 U.S.C. 154(b) by 56 days.

(21) Appl. No.: 17/733,940

(22) Filed: Apr. 29, 2022

(65) Prior Publication Data

US 2022/0348272 A1     Nov. 3, 2022

Related U.S. Application Data

(60) Provisional application No. 63/181,795, filed on Apr. 29, 2021.

(51) Int. Cl.
| | | |
|---|---|---|
| *B62D 37/06* | (2006.01) | |
| *B60W 40/114* | (2012.01) | |
| *B62D 61/02* | (2006.01) | |
| *G01C 19/00* | (2013.01) | |
| *G01C 19/30* | (2006.01) | |
| *G05D 1/00* | (2006.01) | |

(52) U.S. Cl.
CPC ........... *B62D 37/06* (2013.01); *B60W 40/114* (2013.01); *B62D 61/02* (2013.01); *G01C 19/30* (2013.01); *G05D 1/0891* (2013.01)

(58) Field of Classification Search
CPC ...... B62D 37/06; B62D 61/02; B60W 40/114; G01C 19/30; G05D 1/0891; B62K 11/007
See application file for complete search history.

(56) References Cited

U.S. PATENT DOCUMENTS

| | | | |
|---|---|---|---|
| 3,373,832 | A | 3/1968 | Summers |
| 4,200,168 | A | 4/1980 | Moog |
| 5,799,901 | A | 9/1998 | Osder |
| 5,820,439 | A | 10/1998 | Hair, III |

(Continued)

FOREIGN PATENT DOCUMENTS

| | | |
|---|---|---|
| CN | 112292647 A | 1/2021 |
| DE | 2518574 A1 | 11/1975 |

(Continued)

OTHER PUBLICATIONS

Translation of JP-2013-060187-A, Haas et al., Steering Assist System for Two-Wheeled Vehicle and Control Device for Steering Assist System, Apr. 4, 2013, Robert Bosch GMBH.*

(Continued)

*Primary Examiner* — Tyler J Lee
*Assistant Examiner* — Kimia Kohankhaki
(74) *Attorney, Agent, or Firm* — Elliott, Ostrander & Preston, P.C.

(57) ABSTRACT

A control path is added to a two-wheeled self-balancing vehicle that has steering augmentation and CMG or reaction wheel actuators for roll balancing. These actuators are used to damp yaw disturbances while preventing roll disturbances, based on a yaw rate disturbance signal received on the control path.

14 Claims, 11 Drawing Sheets

(56) References Cited

U.S. PATENT DOCUMENTS

| | | | |
|---|---|---|---|
| 6,529,803 B2* | 3/2003 | Meyers | B60W 10/20 |
| | | | 701/1 |
| 7,006,901 B2 | 2/2006 | Wang | |
| 8,919,788 B2 | 12/2014 | Kim et al. | |
| 11,167,816 B2 | 11/2021 | Bailey | |
| 2004/0098185 A1 | 5/2004 | Wang | |
| 2009/0222164 A1 | 9/2009 | Seiniger et al. | |
| 2010/0122859 A1 | 5/2010 | Schroll | |
| 2011/0231085 A1 | 9/2011 | Kim et al. | |
| 2011/0295449 A1 | 12/2011 | Kreider et al. | |
| 2012/0298430 A1 | 11/2012 | Schroll et al. | |
| 2013/0233100 A1 | 9/2013 | Kim | |
| 2013/0238233 A1 | 9/2013 | Kim et al. | |
| 2013/0274995 A1 | 10/2013 | Kim et al. | |
| 2014/0054867 A1 | 2/2014 | Kim et al. | |
| 2014/0129087 A1 | 5/2014 | Takenaka et al. | |
| 2015/0168952 A1 | 6/2015 | Kamen et al. | |
| 2016/0232722 A1 | 8/2016 | Morishima | |
| 2017/0203785 A1 | 7/2017 | Naik et al. | |
| 2019/0077480 A1 | 3/2019 | Bailey | |
| 2020/0102027 A1 | 4/2020 | Kim et al. | |
| 2021/0107573 A1 | 4/2021 | Bailey et al. | |

FOREIGN PATENT DOCUMENTS

| | | | |
|---|---|---|---|
| EP | 1563716 A2 | | 8/2005 |
| EP | 3429910 A1 | | 1/2019 |
| EP | 3601021 A1 | | 2/2020 |
| EP | 3762801 A1 | | 1/2021 |
| EP | 3429910 B1 | | 5/2021 |
| HK | 191271949 | | 7/2019 |
| HK | 40003715 | | 9/2021 |
| JP | 2006513075 A | | 4/2006 |
| JP | 2008024235 A | | 2/2008 |
| JP | 2013-060187 A | * | 4/2013 |
| JP | 2013522108 A | | 6/2013 |
| JP | 2017161308 A | | 9/2017 |
| JP | 2020515469 A | | 5/2020 |
| JP | 2021515340 A | | 6/2021 |
| KR | 1020130013482 A | | 2/2013 |
| KR | 1020140100324 A | | 8/2014 |
| KR | 20200118907 A | | 10/2020 |
| TW | 201345767 A | | 11/2013 |
| TW | 201733844 A | | 10/2017 |
| WO | 2011115699 A1 | | 9/2011 |
| WO | 2013130656 A1 | | 9/2013 |
| WO | 2013130659 A1 | | 9/2013 |
| WO | 2014106547 A1 | | 7/2014 |
| WO | 2017161308 A1 | | 9/2017 |
| WO | 2018183962 A1 | | 10/2018 |
| WO | 2019173597 A1 | | 9/2019 |

OTHER PUBLICATIONS

Notice of Grant for Japanese Patent Application No. 2020-502529, dated Apr. 6, 2023 4 pages.
International Search Report and Written Opinion for International Patent Application No. PCT/US22/271450, dated Aug. 18, 2022, 12 pages.
Notice of Allowance for U.S. Appl. No. 16/979,094, dated Jan. 11, 2023, 15 pages.
Office Action for Japanese Patent Application No. 2020-546951, dated Nov. 24, 2022, 3 pages.
Colvin, Gregory R., "Development and Validation of Control Moment Gyroscopic Stablization," Ohio State University, Feb. 2014, 29 pages.
Extended European Search Report for European Patent Application No. 17767657.4, dated Jan. 30, 2020, 9 pages.
Extended European Search Report for European Patent Application No. 1877005.2, dated Dec. 16, 2020, 11 pages.
Extended European Search Report for European Patent Application No. 19765129.2, dated Nov. 5, 2021, 6 pages.
Final Office Action for U.S. Appl. No. 16/085,975, dated Feb. 11, 2021, 11 pages.
Final Office Action for U.S. Appl. No. 16/979,094, dated Jun. 3, 2022, 26 pages.
International Preliminary Report on Patentability for International Patent Application No. PCT/US2017/023025, dated Sep. 18, 2018, 6 pages.
International Preliminary Report on Patentability for International Patent Application No. PCT/US2018/025571, dated Oct. 1, 2019, 10 pages.
International Preliminary Report on Patentability for International Patent Application No. PCT/US2019/021163, dated Sep. 8, 2020, 6 pages.
International Search Report and Written Opinion for International Patent Application No. PCT/US2017/023025, dated May 29, 2017, 7 pages.
International Search Report and Written Opinion for International Patent Application No. PCT/US2018/025571, dated Jul. 20, 2018, 12 pages.
International Search Report and Written Opinion for International Patent Application No. PCT/US2019/021163, dated Jun. 25, 2019, 7 pages.
Am, Pom Yuan, "Gyroscopic Stabilization of a Kid-Sized Bicycle," 2011 IEEE 5th International Conference on Cybernetics and Intelligent Systems, Sep. 17-19, 2011, pp. 247-252.
Non-final Office Action for U.S. Appl. No. 16/085,975, dated Jun. 11, 2020, 14 pages.
Non-Final Office Action for U.S. Appl. No. 16/499,833, dated Jun. 10, 2021, 22 pages.
Non-Final Office Action for U.S. Appl. No. 16/979,094, dated Jan. 20, 2022, 11 pages.
Notice of Allowance for U.S. Appl. No. 16/085,975, dated Apr. 14, 2021, 34 pages.
Notice of Allowance for U.S. Appl. No. 16/499,833, dated Jan. 14, 2022, 10 pages.
Notice of Grant for European Patent Application No. 17767657.4, dated Nov. 2, 2020, 30 pages.
Notice of Reasons for Rejection for Japanese Patent Application No. 2020-515469, dated Dec. 1, 2021, 19 pages.
Office Action for Taiwan Patent Application No. 106109036, dated Apr. 20, 2020, 12 pages.
Yetkin, Harun, et al. "Gyroscopic Stabilization of an Unmanned Bicycle," Conference Paper in Proceedings of the American Control Conference, Jun. 2014, 7 pages.
Examination Report for EP Patent Application No. 19765129.2, dated Jun. 15, 2023, 6 pages.
International Preliminary Report on Patentability for International Patent Application No. PCT/US22/27145, dated Nov. 9, 2023, 5 pages.
Notice of Intent to Grant for European Patent Application No. 18 777 005.2, dated Apr. 26, 2023, 28 pages.
Office Action for Japanese Patent Application No. 2020-546951, dated Jul. 6, 2023, 2 pages.
Preliminary Rejection for Korean Patent Application No. 10-2020-7028654, dated Dec. 18, 2023, 5 pages.

* cited by examiner

YAW DAMPER FOR TWO-WHEELED
SELF-BALANCING VEHICLE

CROSS-REFERENCE TO RELATED
APPLICATIONS

This U.S. Patent Application claims the benefit of U.S. Provisional Patent Application No. 63/181,795, filed Apr. 29, 2021, the disclosure of which is incorporated by reference herein in its entirety. This U.S. Patent Application is related to U.S. patent application Ser. No. 16/085,975, filed Sep. 17, 2018, entitled "Control of a Two-Wheeled Self-Balancing Vehicle", the disclosure of which is incorporated by reference herein in its entirety. This U.S. Patent Application is related to U.S. patent application Ser. No. 16/499,833, filed Sep. 30, 2019, entitled "Augmented Tire Traction System for Two-Wheeled Vehicle", the disclosure of which is incorporated by reference herein in its entirety. This U.S. Patent Application is related to U.S. patent application Ser. No. 16/979,094, filed Sep. 8, 2020, entitled "Integrated Control Method for Balancing a Two-Wheeled Vehicle Using Control Moment Gyroscopes and Drive-by-Wire Steering Systems", the disclosure of which is incorporated by reference herein in its entirety.

FIELD OF THE INVENTION

The invention relates to two-wheeled self-balancing vehicles. In particular, the invention relates to damping yaw disturbance in two-wheeled self-balancing vehicles.

BACKGROUND

Two-wheeled self-balancing vehicles have two sets of actuators that are used to balance the vehicle. The primary actuators are the Control Moment Gyros (CMG). The CMGs provide torque in the roll axis ("roll axis torque", or simply, "roll torque") to balance the vehicle. The second actuator augments the steering. By adding torque to, or subtracting torque from, the driver commanded steering, the second actuator provides additional roll torque which extends the operational range of the vehicle. The augmented steering actuator changes the steering angle and therefore the yaw rate of the two-wheeled self-balancing vehicle and the subsequent value of centrifugal force. The centrifugal force acts on the center of gravity of the vehicle, producing a change in the roll axis torque. These two actuators work in concert to produce the desired roll axis torque in balancing the two-wheeled self-balancing vehicle. They can also work in a way that cancels the summed roll torque while affecting the yaw rate of the vehicle.

A two-wheeled vehicle can have a low damped vibrational mode in the yaw direction, sometimes referred to as wobble and/or weave. This is because there is no chassis damper that can modify the torsional modes about the yaw axis. The primary damping comes from the horizontal spring damper characteristics of the tires. The spring rate of the chassis also contributes to the oscillation in the yaw direction but, does little to damp the resulting disturbance. Normally the vehicle designer has very limited choices in tire horizontal spring rate and damping. The tires are primarily selected for the road handling performance in the direction of travel.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION OF THE INVENTION

As mentioned above, a two-wheeled self-balancing vehicle has two actuators that produce roll torque: CMGs and a stability augmented steering actuator. This provides a mechanism that when used in concert enhances the yaw damping without affecting the roll torque on the vehicle, according to embodiments of the invention.

Theory

For steady state rotational torque about the roll axis due to steering angle of the front wheel, where P is the wheel base of the vehicle, and w is the steering angle of the wheel:

$$turnRadius(t) = \frac{p}{\tan(\psi(t))}$$

$$TurnCurvature(t) = \frac{\tan(\psi(t))}{p}$$

X is the position of the vehicle in direction of travel:

$$TurningRate(t) = \frac{\tan(\psi(t))\frac{\partial}{\partial t}x(t)}{p}$$

-continued $$TurningAccel(t) = \frac{\tan(\psi(t))\frac{\partial^2}{\partial t^2}x(t)}{p} + \frac{(\tan(\psi(t))^2 + 1)\frac{\partial}{\partial t}x(t)\frac{\partial}{\partial t}\psi(t)}{p}$$

M is the mass of the vehicle:

$$Fcentrifugal(t) = \frac{m\tan(\psi(t))\left(\frac{\partial}{\partial t}x(t)\right)^2}{p}$$

The centrifugal force is reacted to by the tire to ground force and generates a torque:

$$Qcentrifugal(t) = \frac{CGheight\, m\, \tan(\psi(t))\left(\frac{\partial}{\partial t}x(t)\right)^2}{p}$$

The torque that is generated by the change in front wheel and w can be cancelled by a torque imparted by the CMGs:

$$Qcmg = 2\, deldot\, hcmg$$

$$Qcmg(t) = -\frac{CGheight\, m\, \tan(\psi(t))\left(\frac{\partial}{\partial t}x(t)\right)^2}{p}$$

$$deldot(t) = -\frac{CGheight\, m\, \tan(\psi(t))\left(\frac{\partial}{\partial t}x(t)\right)^2}{2\, hcmg\, p}$$

EXAMPLE EMBODIMENT

Figure 1A:
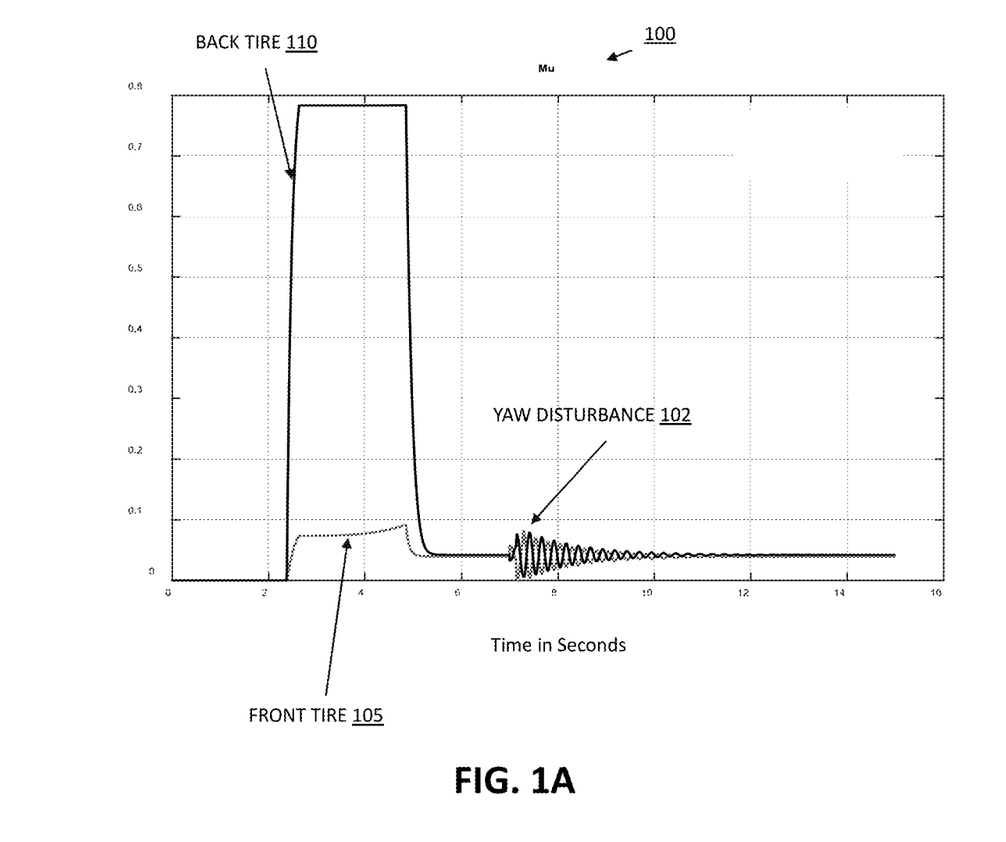
FIG. 1A is a graph of Mu, μ, the ratio of the magnitude of horizontal force and the magnitude of down force.
Figure 1B:
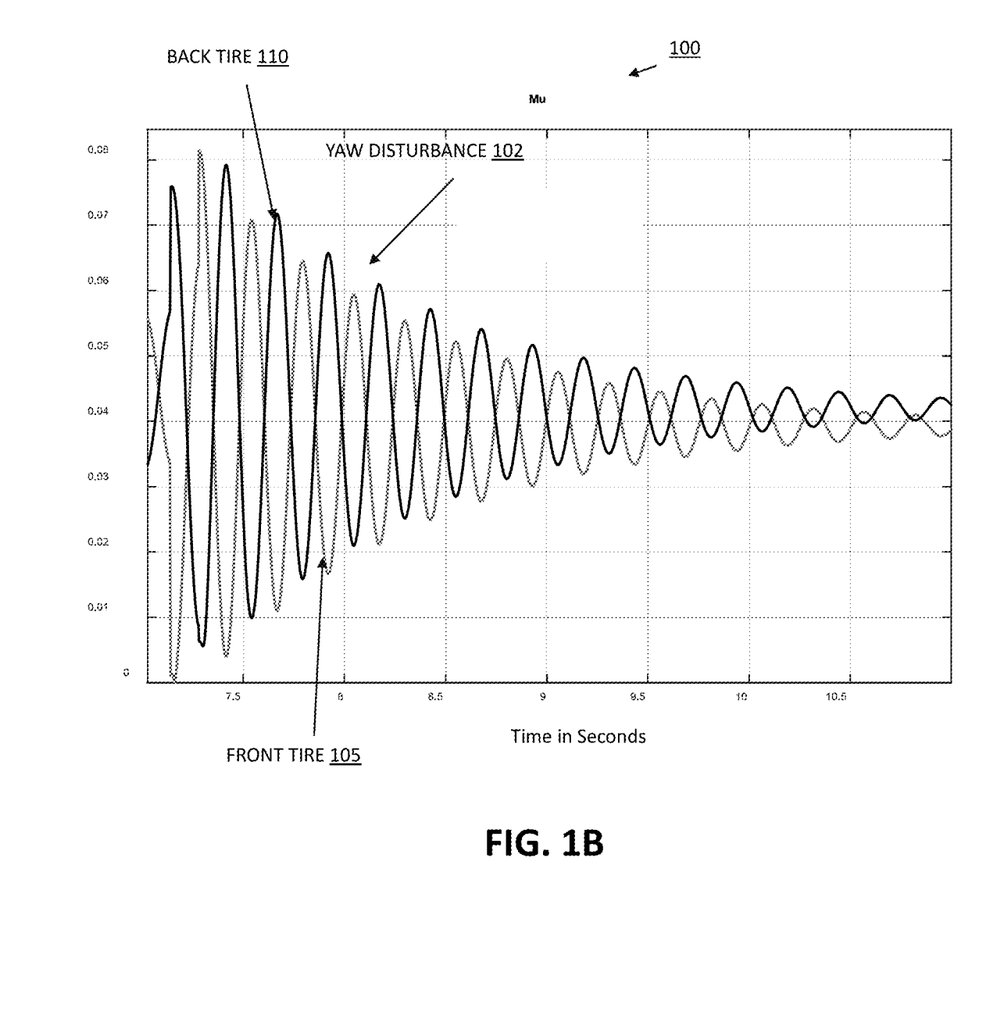
FIG. 1B is a graph of yaw disturbance and shows that the reaction forces of the tires to the yaw disturbance are out of phase.

Starting with a model of a two-wheeled self-balancing vehicle, set the steering wheel so that at 30 kmph the turning rate is 1.5 degrees per second. The vehicle starts at rest and accelerates to 30 kmph, starting at 2.5 seconds. At 7 seconds there is a yaw disturbance 102. Mu, μ, shown in the graph 100 in FIG. 1A, is the ratio of the magnitude of horizontal force and the magnitude of down force. The maximum limit of Mu is governed by the friction coefficient between the respective front tire 105 and back tire 110 and the pavement. The Mu of the tires is offset from zero in this example by traveling a circular path. This makes the yaw disturbance effect easier to visualize, however the yaw damper control according to embodiments of the invention is effective at dampening yaw disturbance given any path. The yaw disturbance 102 is highlighted in graph 100 in FIG. 1B and shows that the reaction forces of the tires to the yaw disturbance are out of phase.

Figure 2:
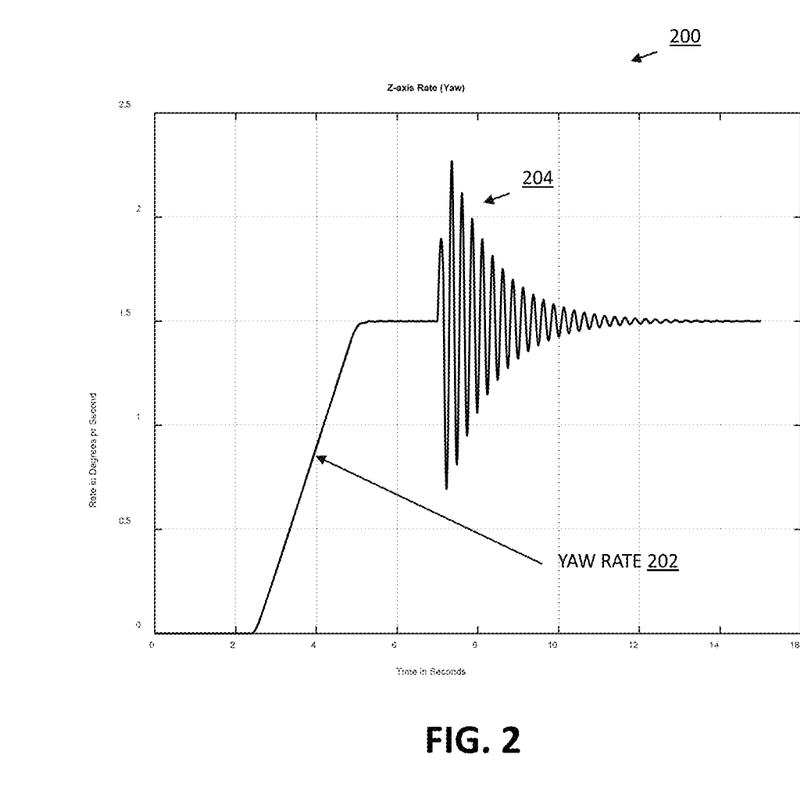
FIG. 2 is a graph that depicts the yaw rate starting at zero and climbing to 1.5 degrees per second as a vehicle accelerates from rest to 30 kmph.

The graph 200 in FIG. 2 depicts the yaw rate 202 starting at zero and climbing to 1.5 degrees per second as the vehicle accelerates from rest to 30 kmph. The value of the yaw rate 202 is disturbed by the yaw impulse induced by the road, as depicted at 204. The yaw disturbance 204 can be felt in the steering wheel because of the variation in the steering torque generated by the centrifugal acceleration and the caster of the steered wheel. The steered wheel in this example is the front wheel, but the steered wheel can be the rear wheel or both wheels, depending on the embodiments. Most production motor cycles incorporate a mechanical damper somewhere in the steering system because of this phenomenon.

The yaw damper control, according to embodiments of the invention, utilizes the CMG and the steering actuator to augment or completely replace the mechanical damper in the steering system to manage this phenomenon.

Figure 3:
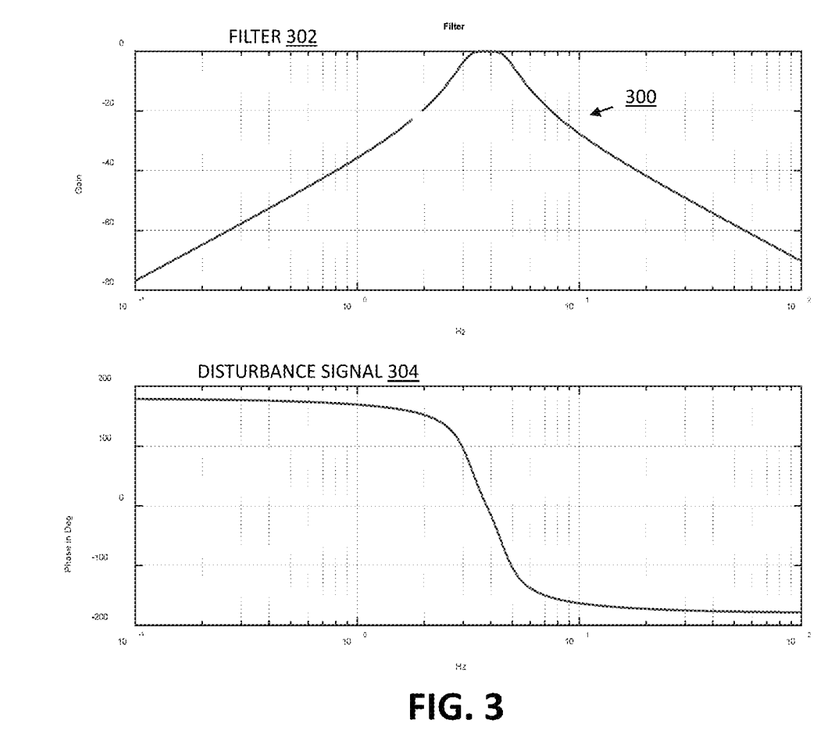
FIG. 3 is a graph of a band pass filter being applied to a full yaw rate signal to capture a disturbance signal.
Figure 4:
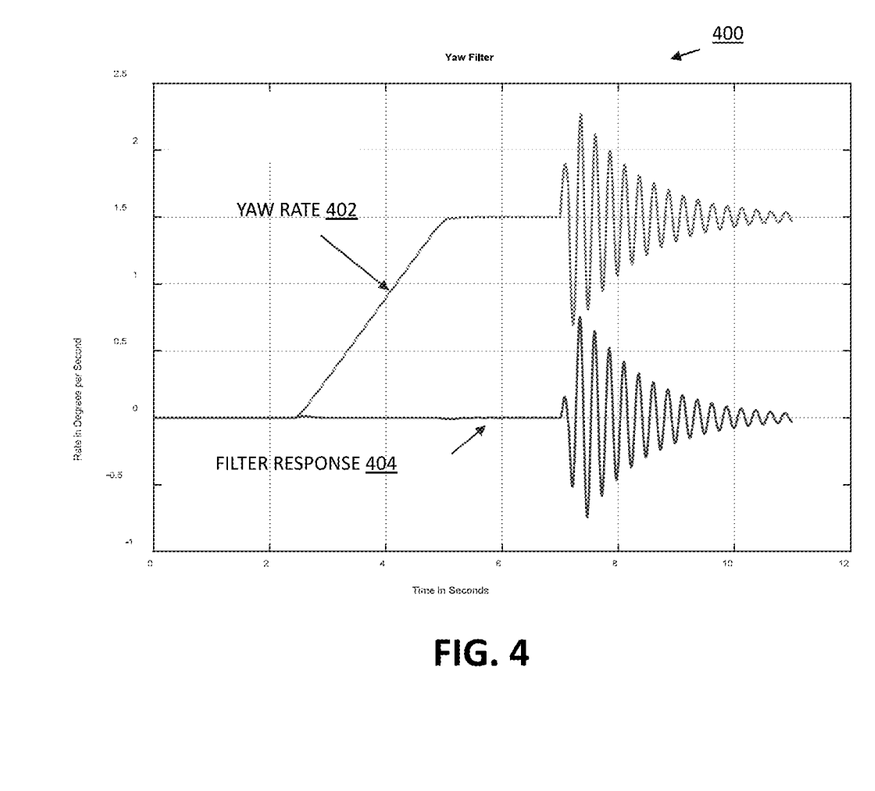
FIG. 4 is a graph that depicts yaw rate and filter response before applying yaw damper control.

The yaw damper control according to embodiments of the invention utilizes a yaw rate signal at the natural frequency of the yaw resonance. In some embodiments, and as depicted in the graph 300 in FIG. 3, a band pass filter 302 is applied to the full yaw rate signal to capture the disturbance signal 304. Graph 400 in FIG. 4 depicts the yaw rate 402 and filter response 404 before applying the yaw damper control.

Figure 5:
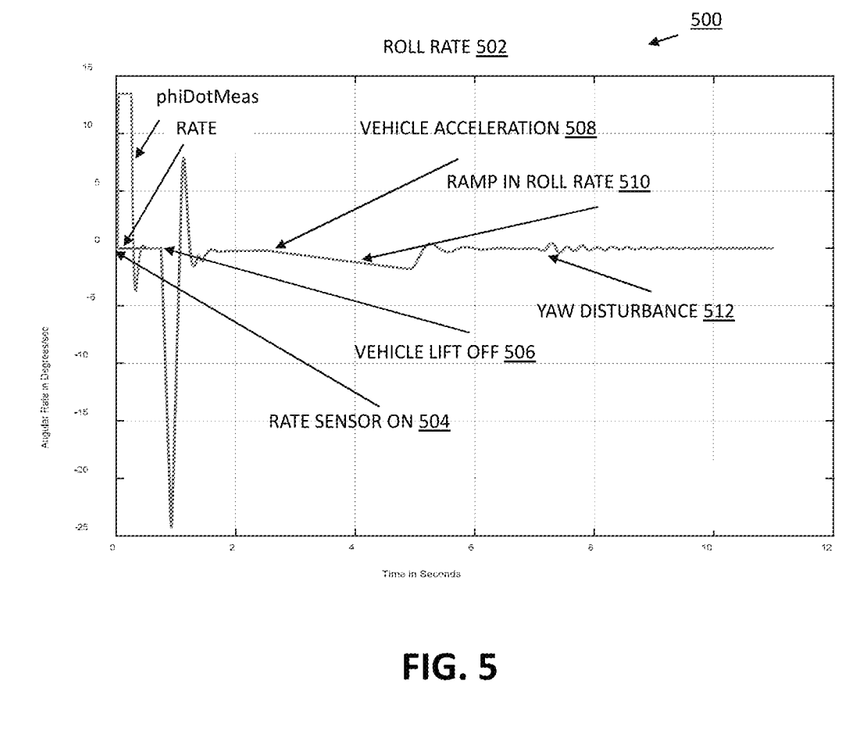
FIG. 5 is a graph showing yaw disturbance has little effect on roll rate of a two-wheeled self-balancing vehicle.

As illustrated in the graph 500 in FIG. 5, the yaw disturbance has little effect on the roll rate 502 of the two-wheeled self-balancing vehicle or on the ability of the balance control to perform correctly. The beginning of the plot, depicted at 504, shows the rate sensor turn on (0.033 seconds). This starts the roll sensor offset calibration. At 0.75 seconds the driver commands the vehicle to lift off the landing gear from an angle of 4 degrees, depicted at 506. At 2.4 seconds, depicted at 508, the vehicle starts to accelerate to 30 kmph driving in a circle that will generate a yaw rate of 1.5 degrees per second. This generates a ramp in roll rate between 2.8 and 5 seconds, depicted at 510, as the vehicle is rolling to maintain balance because the turning rate and velocity is changing. At 7 seconds the yaw disturbance is introduced, depicted at 512.

Figure 6:
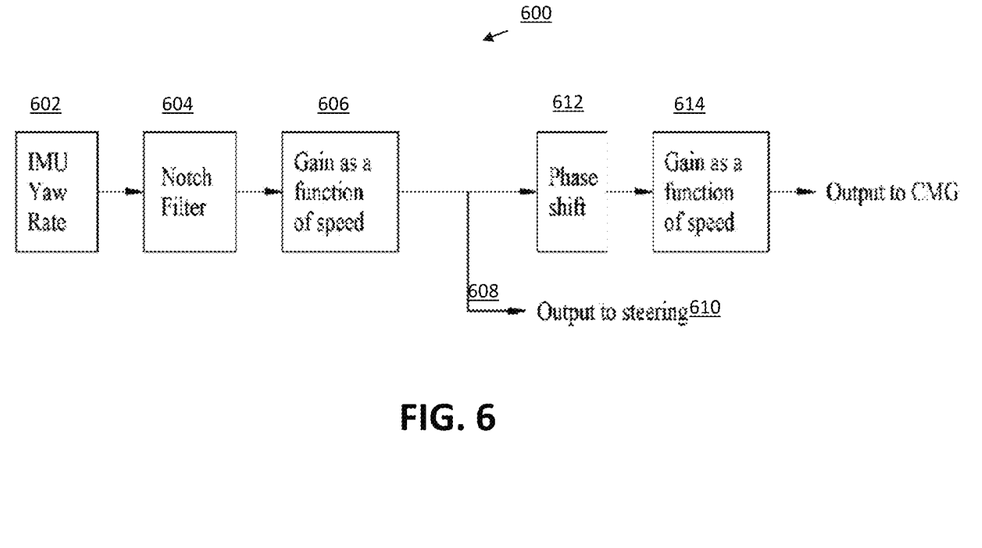
FIG. 6 is a block diagram of yaw damper control using measured yaw rate obtained from an Inertial Measurement Unit (IMU) as a control signal according to embodiments of the invention.

In one embodiment, as shown in the block diagram 600 in FIG. 6, the yaw damper control uses the measured yaw rate obtained from an Inertial Measurement Unit (IMU) 602 as the control signal. The control block diagram is straight forward, using sensors and actuators that are most common in vehicle balance control, and adding a secondary control path that reduces yaw resonance disturbances. The yaw rate, as measured by the IMU, is passed through a notch filter 604 to isolate the yaw disturbance at the vehicle's natural yaw frequency. It is appreciated that in other embodiments different sets of sensors may be used to generate a yaw signal, such as differential accelerometers on the front and back of the vehicle, feedback on the steering angle, force measurement on the steering actuator, etc. The notch filter 604 with its inherent phase shift can be designed for a fixed condition that is incorporated in the control, or it can be a self-tuning filter to allow for variations in vehicle dynamics due to age, tire pressures, etc. The gain 606 is varied as the inverse of vehicle speed and the result is output at 608 to become the command to the augmented steering actuator 610. The gain variation is useful because the yaw torque generated by steering increases as the square of speed. The same signal is passed through a filter 612 that changes the phasing of the signal to compensate for the difference in the response of the steering actuator, the CMG gimbal actuator, and the tire dynamics phase delay. The gain 614 is varied by speed squared because the roll torque from steering is proportional to speed squared and the torque generated by the CMGs is proportional to CMG gimbal rate.

The IMU yaw rate 602 is filtered at 604 to capture the yaw resonance frequency. The phase shift between the steering angle command and the CMG gimbal rate command is achieved in a filter at 612.

Figure 7:
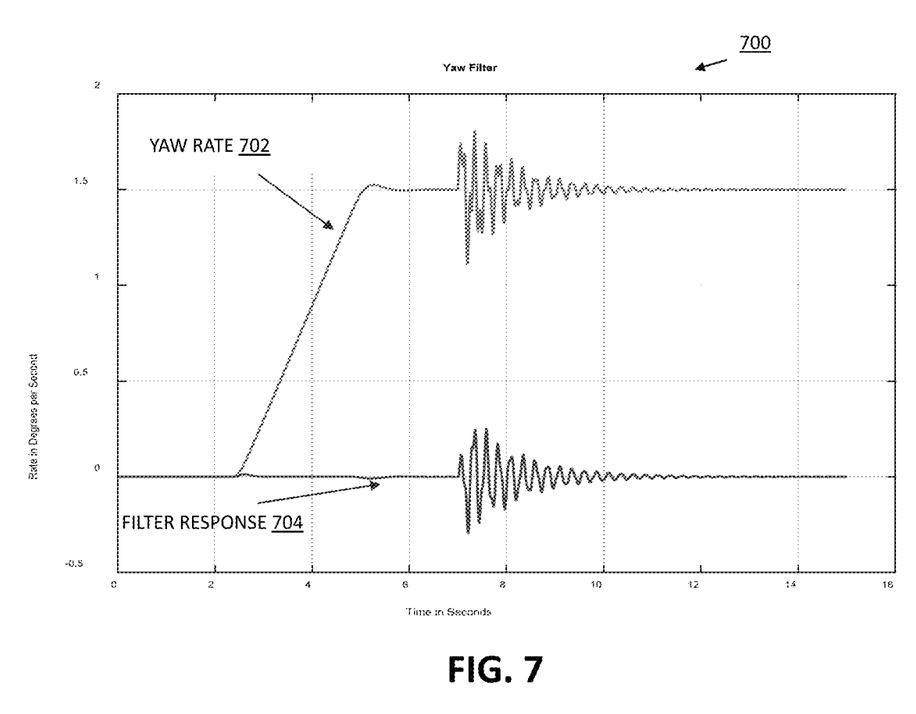
FIG. 7 depicts applying yaw damper control only to steering to reduce the yaw disturbance according to embodiments of the invention.
Figure 8:
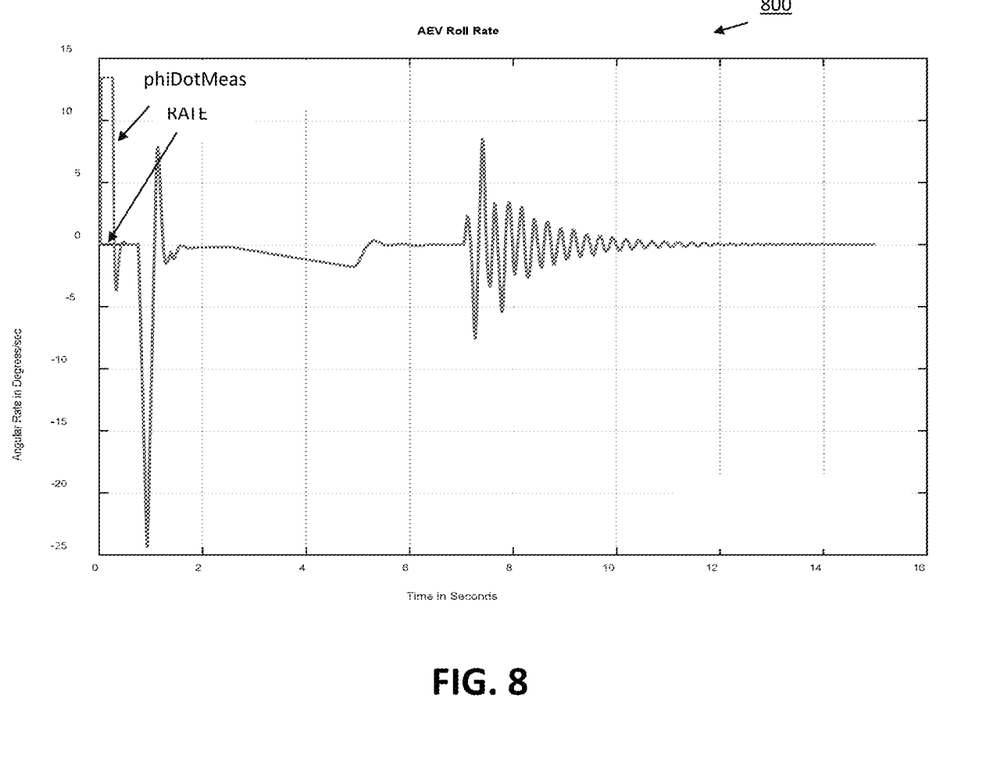
FIG. 8 is a graph that depicts roll disturbance in embodiments not utilizing CMGs, and thus only implement steering control.
Figure 9:
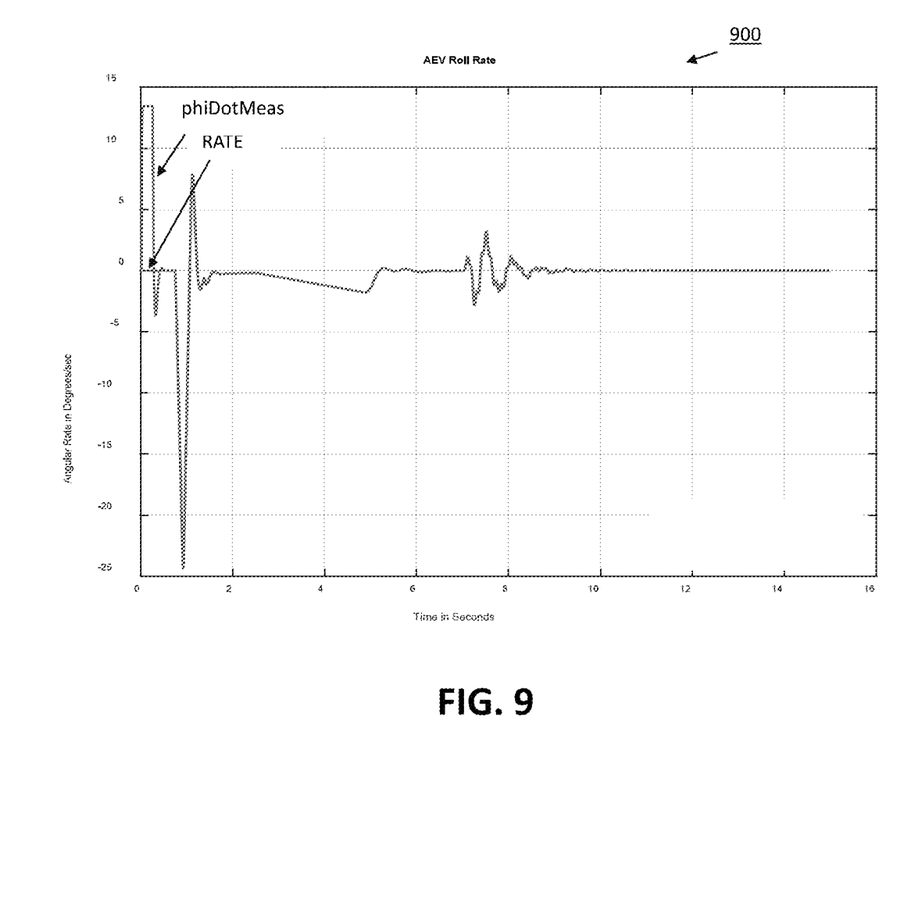
FIG. 9 is a graph depicting a roll rate with yaw disturbance frequency eliminated, after adding CMG compensation results according to embodiments of the invention.

As depicted in graph 700 of FIG. 7, applying the yaw damper control only to steering reduces the yaw disturbance. Compare, for example, the yaw rate 402 in FIG. 4 with the yaw rate 702 in FIG. 7 and the filter response 404 in FIG. 4 with the filter response 704 in FIG. 7. Embodiments not utilizing CMGs may only implement the steering control. However, there is a resulting roll disturbance, as depicted in graph 800 in FIG. 8. Rotating the front tire to damp the yaw disturbance results in a vehicle roll rate disturbance. This disturbance can be compensated for by using the Control Moment Gyros to produce a roll torque canceling the roll disturbance caused by the steering yaw damping. Adding the CMG compensation results in a roll rate with the yaw disturbance frequency eliminated, as depicted in graph 900 in FIG. 9. This embodiment not only dampens the yaw disturbance but enhances driver comfort. This is something a mechanical damper alone cannot do.

Thus, as described above, embodiments of the invention contemplate adding a secondary control path to a self-balancing two-wheeled self-balancing vehicle that has steering augmentation and CMG or reaction wheel actuators for roll balancing. These actuators are used to damp yaw disturbances while preventing roll disturbances.

According to one embodiment, the secondary control path uses a notch filter and gain to isolate the natural yaw frequency of the vehicle or any other undesirable oscillation with the appropriate phase delay and gain to vary the steered wheel or wheels of the vehicle to damp the yaw disturbance. According to this embodiment, the secondary control path uses the augmented steering command to generate a CMG gimbal rate or reaction wheel speed rate command with the appropriate gain and phase to cancel the roll torque generated by the yaw damping steering command.

In one embodiment, the secondary control path is mechanized by adding a software path to the existing control mechanization for the self-balancing control of the baseline vehicle. In one embodiment, the secondary control path may include a separate digital or analog control adding a control signal to the steering actuator and the roll torque actuator being one or more CMGs or one or more reaction wheel roll torque actuators.

In the above embodiments, the secondary control path may have active tuning to accomplish the yaw damping while compensating for variations in natural frequency due to vehicle changing characteristics rather than a fixed tuning accomplished in the factory or maintenance shop.

Figure 10:
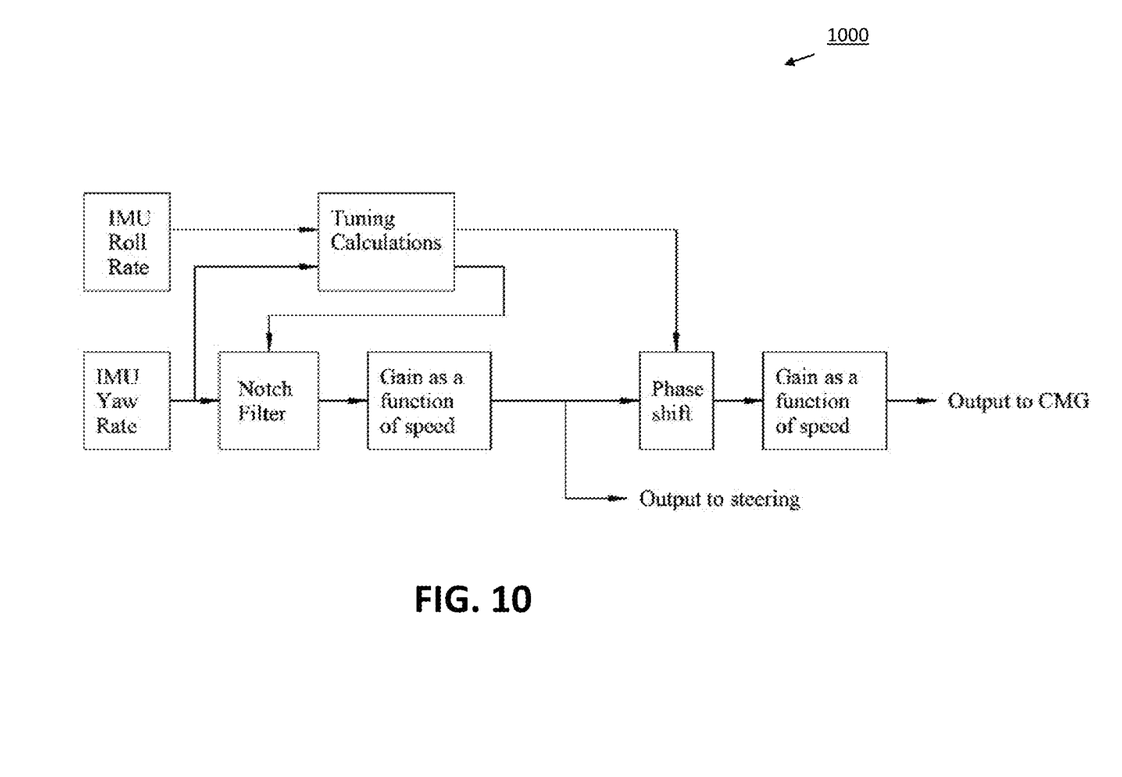
FIG. 10 illustrates a block diagram according to embodiments of the invention that have no CMGs, in which the secondary control path utilizes steering only to maintain balance and has active tuning to accomplish yaw damping while compensating for variations in natural frequency due to vehicle changing characteristics.

With reference to the block diagram 1000 in FIG. 10, in the embodiments that have no CMGs, the secondary control path utilizes steering only to maintain balance and has active tuning to accomplish the yaw damping while compensating for variations in natural frequency due to vehicle changing characteristics rather than employing fixed tuning accomplished in the factory or maintenance shop.

Thus, embodiments of the invention add a secondary control path to a self-balancing two-wheeled self-balancing vehicle that has steering augmentation and CMG or reaction wheel actuators for roll balancing. These actuators are used to damp yaw disturbances while preventing roll disturbances.

These embodiments may use a notch filter and gain to isolate the natural yaw frequency of the vehicle or any other undesirable oscillation with the appropriate phase delay and gain to vary the steered wheel or wheels of the vehicle to damp the yaw disturbance.

Embodiments may use an augmented steering command to generate a CMG gimbal rate or reaction wheel speed rate command with the appropriate gain and phase to cancel the roll torque generated by the yaw damping steering command.

Embodiments may be mechanized by adding a software path to the existing control mechanization for the self-balancing control of the baseline vehicle.

Embodiments may use separate digital or analog control adding a control signal to the steering actuator and the roll torque actuator being one or more CMGs or one or more reaction wheel roll torque actuators.

Embodiments may use active tuning to accomplish the yaw damping while compensating for variations in natural frequency due to vehicle changing characteristics rather than a fixed tuning accomplished in the factory or maintenance shop.

Embodiments may use steering only (no CMGs) to maintain balance and use active tuning to accomplish the yaw damping while compensating for variations in natural frequency due to vehicle changing characteristics rather than a fixed tuning accomplished in the factory or maintenance shop.

Thus, described is a method for controlling a two-wheeled self-balancing vehicle ("vehicle"), comprising receiving, by one or more sensors mounted on the vehicle, a yaw rate signal of the vehicle; obtaining, by a signal filter coupled to the one or more sensors, a yaw rate disturbance signal from the yaw rate signal; and receiving the yaw rate disturbance signal as a control input to an augmented steering actuator that augments a driver-controlled steering actuator, the yaw rate disturbance signal to be used to generate a torque about a roll axis ("roll torque") of the vehicle that reduces or cancels a roll rate disturbance of the vehicle; and generating the roll torque, by the augmented steering actuator, according to the received yaw rate disturbance signal, to reduce or cancel the roll rate disturbance of the vehicle.

According to embodiments, the augmented steering actuator modifies a steering angle and therefore a yaw rate and a centrifugal force of the vehicle wherein the centrifugal force of the vehicle acts on a center of gravity of the vehicle, producing a change in the roll torque of the vehicle.

According to further embodiments the yaw rate disturbance signal is received as a control input to a control moment gyroscope (GMG) coupled to the vehicle to balance the vehicle, the yaw rate disturbance signal to be used to generate a roll torque of the vehicle that reduces or cancels a yaw rate disturbance of the vehicle; and the CMG generates the roll torque according to the received yaw rate disturbance signal, to reduce or cancel the yaw rate disturbance of the vehicle.

The invention claimed is:

1. A method for controlling a two-wheeled self-balancing vehicle ("vehicle"), comprising:
    receiving, by one or more sensors mounted on the vehicle, a yaw rate signal of the vehicle;
    obtaining, by a signal filter coupled to the one or more sensors, a yaw rate disturbance signal from the yaw rate signal; and
    receiving the yaw rate disturbance signal as a control input to an augmented steering actuator that augments a driver-controlled steering actuator, the yaw rate disturbance signal to be used to generate a torque about a roll axis ("roll torque") of the vehicle that reduces or cancels a roll rate disturbance of the vehicle; and
    generating the roll torque, by the augmented steering actuator, according to the received yaw rate disturbance signal, to reduce or cancel the roll rate disturbance of the vehicle.

2. The method of claim 1, wherein the augmented steering actuator modifies a steering angle and therefore a yaw rate and a centrifugal force of the vehicle wherein the centrifugal force of the vehicle acts on a center of gravity of the vehicle, producing a change in the roll torque of the vehicle.

3. The method of claim 1, wherein receiving, by the one or more sensors mounted on the vehicle, the yaw rate signal of the vehicle comprises receiving by the one or more sensors, selected from a group of sensors consisting of: an inertial measurement unit (IMU), a differential accelerometer, a feedback sensor for a steering angle of the vehicle, or a force measurement sensor on the augmented steering actuator of the vehicle, the yaw rate signal of the vehicle.

4. The method of claim 1, wherein the yaw rate signal comprises a natural frequency of a yaw resonance of the vehicle.

5. The method of claim 1, wherein obtaining, by the signal filter coupled to the one or more sensors, the yaw rate disturbance signal from the yaw rate signal comprises obtaining, by a self-tuning filter coupled to the one or more sensors to allow for variations in vehicle dynamics, the yaw rate disturbance signal from the yaw rate signal.

6. The method of claim 1 wherein the yaw rate disturbance signal is caused by a yaw impulse induced by a road over which the vehicle is traveling.

7. The method of claim 1, further comprising:
receiving the yaw rate disturbance signal as a control input to a control moment gyroscope (CMG) coupled to the vehicle to balance the vehicle, the yaw rate disturbance signal to be used to generate a roll torque of the vehicle that reduces or cancels a yaw rate disturbance of the vehicle; and
generating the roll torque, by the CMG, according to the received yaw rate disturbance signal, to reduce or cancel the yaw rate disturbance of the vehicle.

8. A two-wheeled self-balancing vehicle ("vehicle"), comprising:
an augmented steering actuator of the vehicle, to generate roll torque for the vehicle;
one or more sensors mounted on the vehicle to receive a yaw rate signal of the vehicle; and
a signal filter coupled to the one or more sensors to obtain a yaw rate disturbance signal from the yaw rate signal and provide the yaw rate disturbance signal as a control input to the augmented steering actuator, the augmented steering actuator to produce a roll torque that reduces or cancels a roll rate disturbance of the vehicle responsive to the yaw rate disturbance signal.

9. The vehicle of claim 8, wherein the augmented steering actuator modifies a steering angle and therefore a yaw rate and a centrifugal force of the vehicle wherein the centrifugal force of the vehicle acts on a center of gravity of the vehicle, producing a change in the roll torque of the vehicle.

10. The vehicle of claim 8, wherein the one or more sensors are selected from a group of sensors consisting of: an inertial measurement unit (IMU), a differential accelerometer, a feedback sensor for a steering angle of the vehicle, or a force measurement sensor on the augmented steering actuator of the vehicle.

11. The vehicle of claim 8, wherein the yaw rate signal comprises a natural frequency of a yaw resonance of the vehicle.

12. The vehicle of claim 8, wherein the signal filter coupled to the one or more sensors to obtain the yaw rate disturbance signal from the yaw rate signal comprises a self-tuning filter coupled to the one or more sensors to allow for variations in vehicle dynamics, and obtain the yaw rate disturbance signal from the yaw rate signal.

13. The vehicle of claim 8 wherein the yaw rate disturbance signal is caused by a yaw impulse induced by a road over which the vehicle is traveling.

14. The vehicle of claim 8, further comprising:
a control moment gyroscope (CMG) coupled to the vehicle to generate roll torque to balance the vehicle, the signal filter providing the yaw rate disturbance signal as a control input to the CMG to produce a roll torque that reduces or cancels a yaw rate disturbance in the vehicle responsive to the yaw rate disturbance signal.

* * * * *